US 8,333,658 B2

(12) United States Patent
Blythe et al.

(10) Patent No.: US 8,333,658 B2
(45) Date of Patent: Dec. 18, 2012

(54) DETERMINING AUTHORIZATION TO MANIPULATE A TOKEN

(75) Inventors: Michael Blythe, Albany, OR (US); Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2380 days.

(21) Appl. No.: 11/037,845

(22) Filed: Jan. 18, 2005

(65) Prior Publication Data

US 2010/0005524 A1    Jan. 7, 2010

(51) Int. Cl.
*A63F 9/24* (2006.01)
*A63F 13/00* (2006.01)
*G06F 17/00* (2006.01)
*G06F 19/00* (2006.01)

(52) U.S. Cl. .......................................... 463/29; 463/30
(58) Field of Classification Search .............. 273/148 R; 460/14, 39, 40, 29, 30
See application file for complete search history.

(56) References Cited

U.S. PATENT DOCUMENTS

| D441,733 S | 5/2001 | Do et al. |
| 6,612,928 B1* | 9/2003 | Bradford et al. ................. 463/29 |
| 6,629,591 B1* | 10/2003 | Griswold et al. ............. 194/205 |
| 6,655,585 B2 | 12/2003 | Shinn |
| 6,709,333 B1 | 3/2004 | Bradford et al. |
| 6,712,698 B2 | 3/2004 | Paulsen et al. |
| 6,728,346 B2 | 4/2004 | Czyszczewski et al. |
| 6,761,634 B1* | 7/2004 | Peterson et al. ................. 463/30 |
| 6,775,397 B1 | 8/2004 | Hamalainen |
| 6,788,928 B2 | 9/2004 | Kohinata et al. |
| 2004/0097217 A1 | 5/2004 | McClain |
| 2004/0149827 A1 | 8/2004 | Zuili |
| 2004/0180646 A1 | 9/2004 | Donley et al. |
| 2004/0186995 A1 | 9/2004 | Yim et al. |
| 2004/0188519 A1 | 9/2004 | Cassone |

* cited by examiner

*Primary Examiner* — David L Lewis
*Assistant Examiner* — Reginald Renwick (57) ABSTRACT

In one embodiment, a method includes determining the authorization of a user to manipulate a token relative to a display device using identification information.

12 Claims, 7 Drawing Sheets

DETERMINING AUTHORIZATION TO MANIPULATE A TOKEN

BACKGROUND

Display systems have been developed that comprise tabletop interactive displays that can be used both as an output device and as an input device With these display systems, it can be difficult to input the full range of desired information.

BRIEF DESCRIPTION OF THE DRAWINGS

The disclosed systems, devices, and methods can be better understood with reference to the following drawings. The components in the drawings may be depicted to scale.

DETAILED DESCRIPTION

A display system, such as an interactive display system, is disclosed that enables two-way communication between the system and one or more users of the system, for example using an appropriate input device. Control is provided within the system such that inputs entered using the input device are conveyed or accepted if the user is entitled to enter such an input, otherwise the entered inputs are not conveyed. As is described in the following, the input device receives identification information from the user, which is used to determine the identity of the user and/or the authorization of the user to enter a given input. In some embodiments, the identification and/or authorization determination is made by the input device. In other embodiments, the input device conveys received identification information to a display device, such as an interactive display device, such that the device can make the identification and/or authorization determination. In either case, control is maintained over use of the input device relative to the identity of the user attempting to manipulate the input device.

Figure 1:
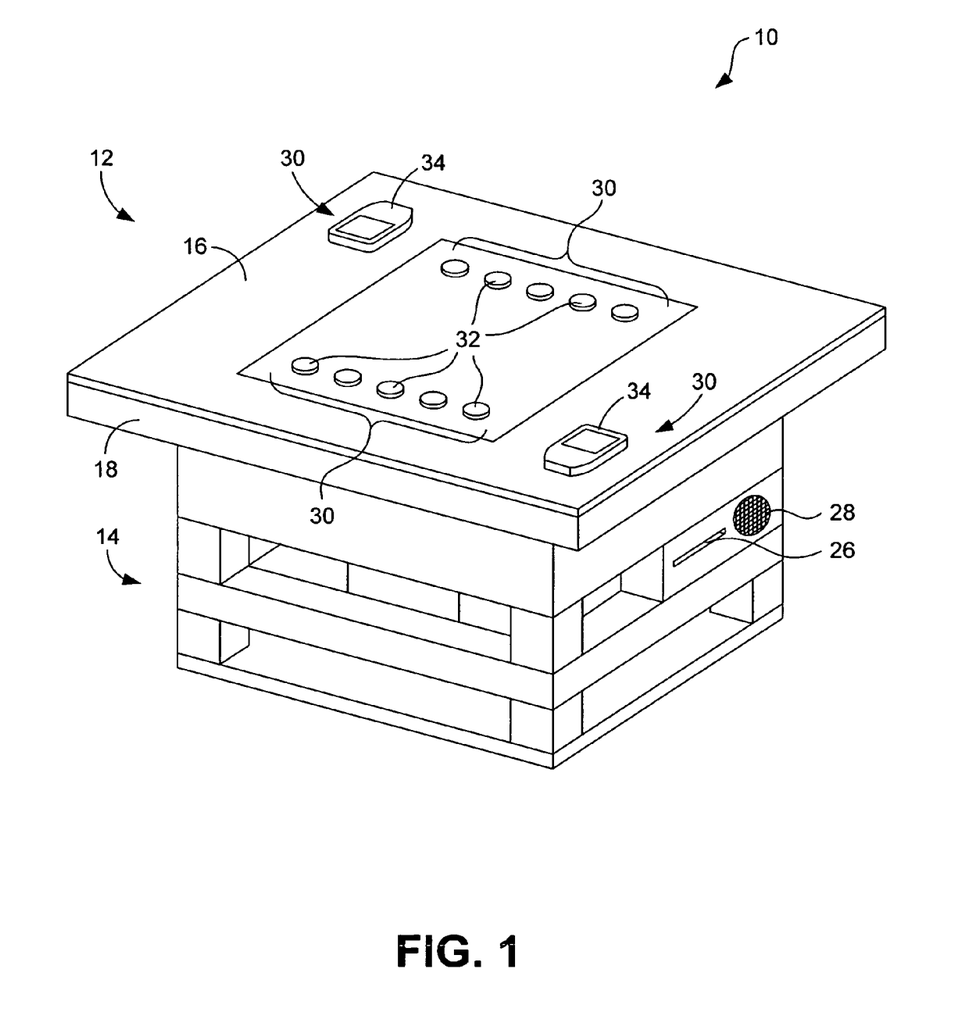
FIG. 1 is a perspective view of an embodiment of an interactive display system.

Referring now to the figures, in which like numerals identify corresponding parts, FIG. 1 illustrates an example of a display system, such as interactive display system 10. In the embodiment of FIG. 1, the interactive display system 10 comprises an interactive display device 12 that is formed as a table having a base 14 and an interactive display 16 that is integrated into the tabletop 18. In such an arrangement, one or multiple persons may interact with the device 12, for instance when seated next to the device. Although a table embodiment is shown in FIG. 1 and is described herein, the interactive display system 10 can take other forms. For example, the interactive display device 10 could, alternatively, be vertically oriented in a manner in which the interactive display is mounted to a vertical surface in similar manner to wall-mounted flat panel televisions.

Figure 2:
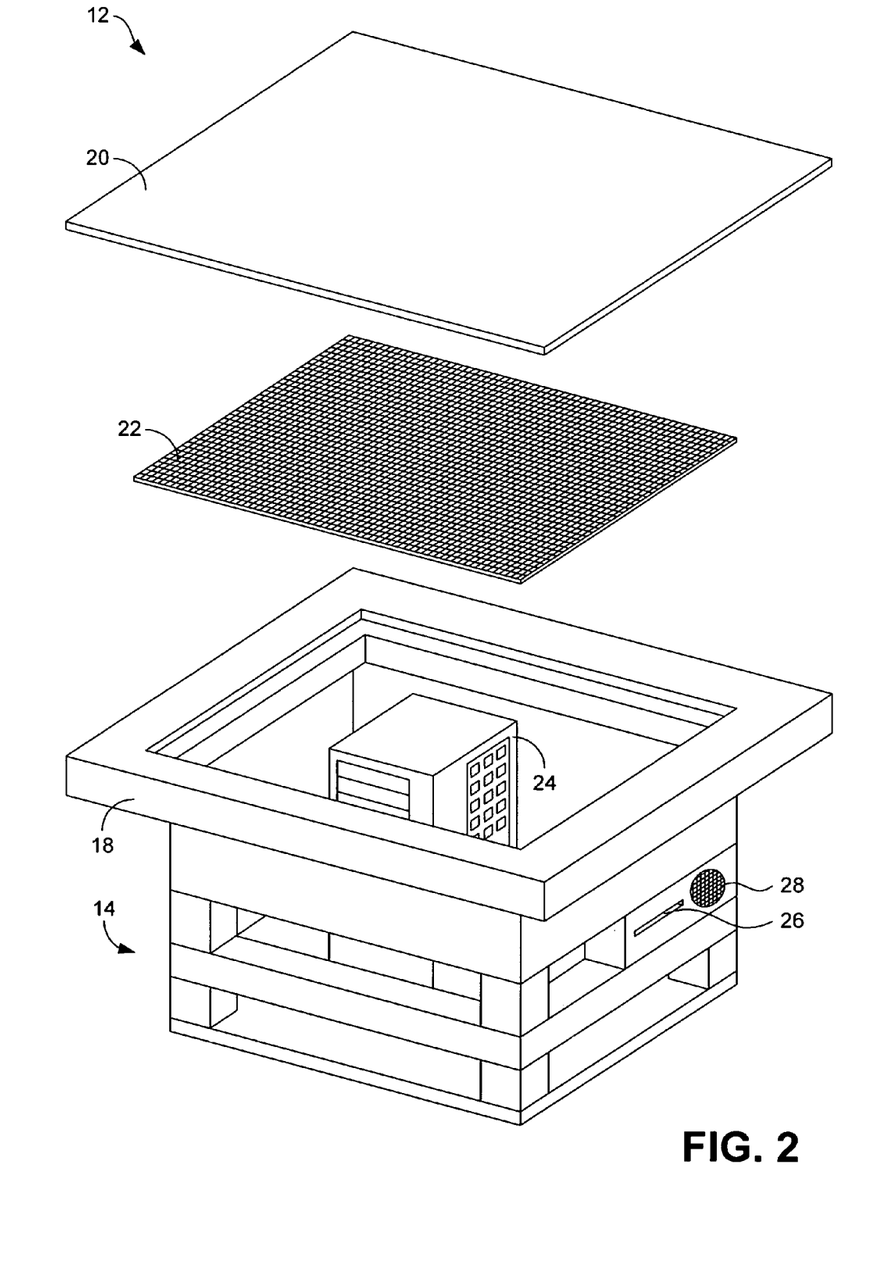
FIG. 2 is an exploded view of the embodiment of the interactive display device shown in FIG. 1.

As is indicated in the exploded view of FIG. 2, the interactive display device 12 includes a display surface 20, a display medium 22, and a controller 24 that controls what image data is displayed using the display medium. By way of example, in an embodiment, the display medium 22 may comprise a digital light processor (DLP). In such a case, the controller 18 generates electrical image signals indicative of viewable images, such as computer graphics, video, Internet web pages, etc., which are provided to the DLP. The controller 18 can take several forms, such as a personal computer (PC), microprocessor, or other electronic devices capable of providing image signals to a DLP. The DLP, in response to the electrical signals, generates digital optical (viewable) images that may be viewed through the display surface 20, which can comprise a glass or plexiglass pane. In some embodiments, the controller 18 receives data used to generate the image signals from various sources, such as hard drives, compact discs (CDs) or digital video discs (DVDs), computer servers, local and/or wide area networks, and the Internet. The interactive display device 12 can therefore include a disc drive 26 that, for example, is accessed through the table base 14. The device 12 can further include an audio output device 28, such as speaker, to output audio that is to accompany displayed image data.

With reference to FIG. 1, the interactive display system 10 further includes one or more input devices or "tokens" 30. As is indicated in FIG. 1, the tokens 30 can comprise different configurations. In the example embodiment of FIG. 1, the tokens 30 include game pieces 32 and portable computing devices 34. The game pieces 32 can comprise relatively simple game pieces, such as those used in checkers or chess (depicted in FIG. 1), or more complex game pieces, such as devices that comprise their own input/output devices and that track various information such as player statistics (not shown). The portable computing devices 34 can comprise personal digital assistants (PDAs), mobile telephones, media (e.g., music) players, or other devices that have the attributes of a computer. In some cases, the portable computing devices 34 can comprise notebook computers (not shown). Although the portable computing devices 34 are described as tokens for the interactive display system 10, the portable computing devices can alternatively or in addition be used as input devices for other tokens, such as a game piece. Such functionality is discussed below. As is further described below, the tokens 30 at least comprise components that can receive identification information from a user and communicate the information to the interactive display device 12.

Figure 3:
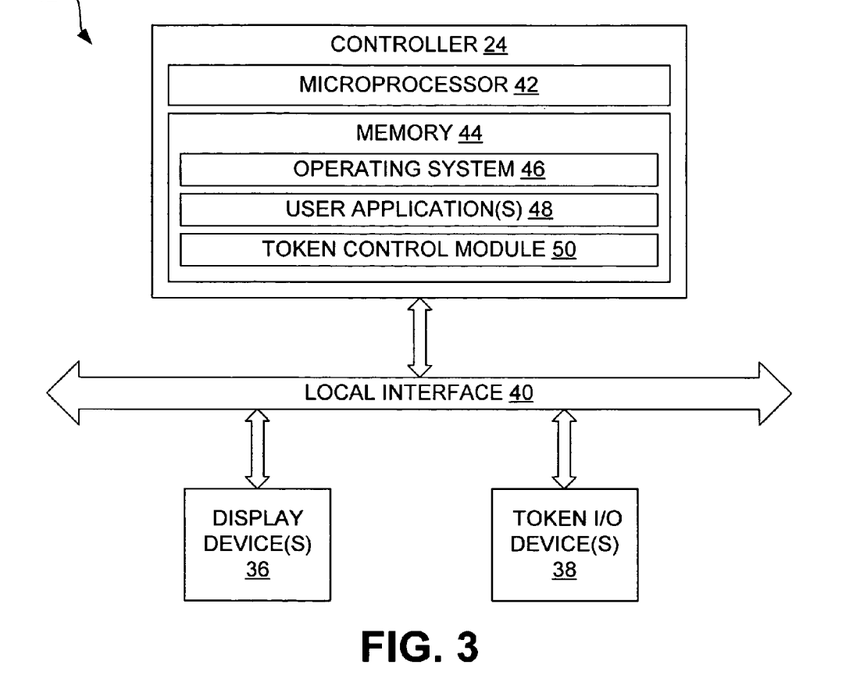
FIG. 3 is a block diagram of an embodiment of the architecture of the interactive display device of FIG. 2.

FIG. 3 is a block diagram illustrating an example architecture for the interactive display device 12 shown in FIGS. 1 and 2. As is indicated in FIG. 3, the interactive display device 12 comprises the controller 24 identified in FIG. 2, as well as one or more display devices 36 and one or more token input/output (I/O) devices 38, each of which is connected to a local interface 40, such as an internal bus.

In the embodiment of FIG. 3, the controller 24 includes a microprocessor 42 and memory 44. The microprocessor 42, for example, comprises a semiconductor-based microprocessor, such as a microchip, and the memory 44 includes any suitable one of or a combination of volatile memory elements (e.g., RAM) and nonvolatile memory elements (e.g., hard disk, CDROM, etc.).

The display devices 36 comprise the components that are used to generate image data (e.g., graphics, video) that is displayed to the user. As is described above in relation to FIGS. 1 and 2, these display devices 36 can, in some embodiments, comprise a DLP. Such a DLP can take a variety of forms. Generally speaking, however, the DLP generates a viewable digital image by projecting a plurality of pixels of light onto the display surface 20. It is common for each viewable image to be made up from millions of pixels. Each pixel is individually controlled by the DLP to have a certain color (or grey-scale). The combination of many light pixels of different colors (or grey-scales) on the display surface 20 generates a viewable image or "frame." Continuous video and graphics can be generated by sequentially combining frames together, as in a motion picture. In one embodiment, the DLP includes a digital micro-mirror device (DMD) to project the light pixels onto the display surface 14. Other embodiments can include diffractive light devices (DLD), liquid crystal on silicon devices (LCOS), plasma displays, liquid crystal displays, or other spatial light modulator and display technologies.

The token I/O devices 38 facilitate two-way communications between the controller 24 and the tokens 30. As is described in greater detail below, the nature of the communications from the tokens 30 can vary depending upon their configuration. Therefore, the manner with which the token I/O devices 38 communicate can likewise vary depending upon the particular application. Communications may comprise optical communications such as visible light communications or infrared (IR) communications, radio communications such as short-range radio frequency (RF) communications, electrical communications such as via wire-based communications, or another communication method. Accordingly, the token I/O devices 38 can be considered to comprise a receiver that receives or collects information from the tokens 30 and, in some embodiments, a transmitter that transmits information to the tokens.

In some embodiments, transmissions from the interactive display device 12 to the tokens 30 comprise modulated optical signals that are generated by the display devices (e.g., the DLP). In such a case, the display devices 36 may be considered to comprise a token I/O device 38. Such transmissions can be effected by sequentially projecting a series of visible images (frames) to the display surface 20 that contain interspersed, subliminal optical signals that are difficult to detect with the unaided human eye. The subliminal optical signals comprise encoded information that is received by the tokens. Such a methodology can be used, for example, to locate the physical positions of tokens 30 resting on the display surface 20. For example, the controller 24 can transmit a subliminal positioning signal over the display surface, using various methodologies. When a token 30 receives the subliminal positioning signal, the token can send a unique feedback signal to the controller 24. Through receipt of the unique feedback signals, the controller can determine the position of each token provided on the display surface 24 and establish simultaneous two-way communication with each token 30 for the remaining portion of the image frame.

Notably, the interactive display device 12 can comprise other components not shown in FIG. 3. For example, the device 12 can comprise other I/O devices that are facilitate communications with other devices such one or more of a parallel port, universal serial bus (USB) port, or a small computer system interface (SCSI) port, as well as one of more of a modulator/demodulator (e.g., modem), network card, etc.

The memory 44 comprises various programs including an operating system 46, one or more user applications 48, and a token control module 50. The operating system 46 controls the execution of other programs and provides scheduling, input-output control, file and data management, memory management, and communication control and related services. The user applications 48 include any programs that the user may use in conjunction with the interactive display device 12, such as office-type programs, games, Internet browsers, and so forth. The token control module 50 is configured to control use of the tokens. For example, the token control module 50 can, in some embodiments, determine whether to accept inputs entered via a given token 30 based upon the identify of the user that is operating the token and/or that user's privileges. Operation of the token control module 50 is described in relation to FIGS. 5 and 8 below.

Figure 4:
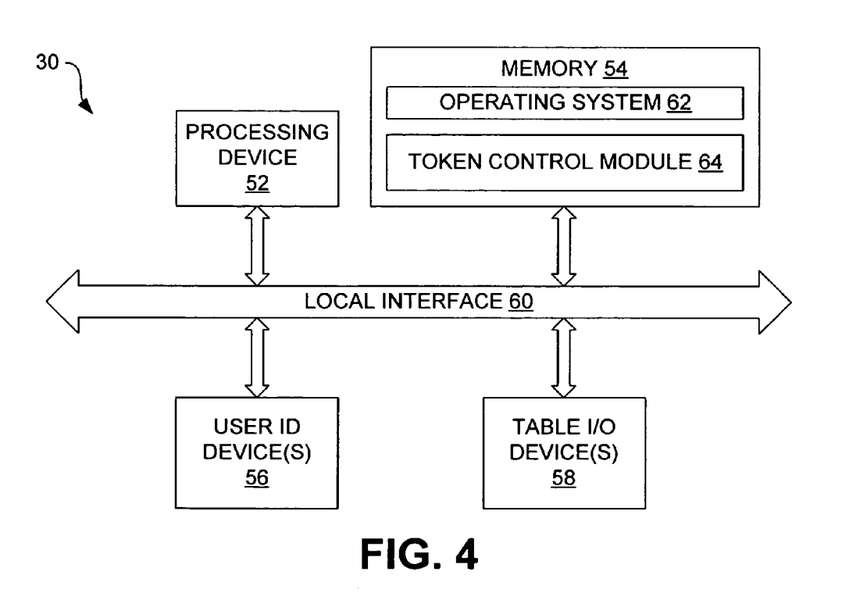
FIG. 4 is a block diagram of an embodiment of the architecture of a token shown in FIG. 1.

FIG. 4 is a block diagram illustrating an example architecture for a token 30 shown in FIG. 1. As indicated in FIG. 4, the token 30 of this embodiment comprises a processing device 52, memory 54, at least one user identification (ID) device 56, and at least one table I/O device 58. Each of those components is connected to a local interface 60.

The processing device 52 is adapted to execute commands stored in memory 54 and can comprise a general-purpose processor, a microprocessor, one or more application-specific integrated circuits (ASICs), a plurality of suitably configured digital logic gates, or other electrical configurations comprised of discrete elements that coordinate the overall operation of the token 30. The memory 54 comprises any suitable one or a combination of volatile memory elements (e.g., random access memory (RAM)) and nonvolatile memory elements (e.g., read-only memory (ROM), flash memory, hard disk, etc.).

The user ID devices 56 comprise one or more components that are used to collect user identification information. In some embodiments, the user ID devices 56 directly collect that information from the user. For example, the ID devices 56 can include a biometric scanning device, such as a fingerprint scanner or a retina scanner, or a pH detector that collects biometric information directly from the user. To cite another example of direct collection, the ID devices 56 can include a keypad or other input device with which the user may enter identification information, such as a username and/or password. As a further example, the ID devices 56 can comprise a reader device that is configured to read information that is stored on another device or object. For instance, the ID devices 56 can comprise a card reader that is configured to read information from a magnetic strip of an ID card, or an RFID reader that reads information stored on an RFID card or tag.

In other embodiments, the user ID devices 56 indirectly collect the user identification information. In such a case, the user identification information can be directly collected with another device, and then transmitted to the token 30 for further transmission to the interactive display device 12. Such transmission could be an electrical transmission (e.g., via a communication wire or cable) or a wireless transmission (e.g., RF, optical, etc.).

The table I/O devices 58 comprise components that facilitate two-way communications with the interactive display device 12 or "table." The nature of the table I/O devices 58 may depend upon the configuration of the token I/O devices 38 of the interactive display device 38. By way of example, the table I/O devices 58 comprise components that facilitate optical communications, radio communications, or electrical communications. Accordingly, the table I/O devices 58 can be considered to comprise a transmitter that transmits information to the interactive display device 12 and, in some embodiments, a receiver that receives information from the interactive display device. In some embodiments, the token 30 comprises an optical receiver configured to receive optical signals from the display devices 36 (e.g., DLP) through the display surface 20. Such an optical receiver can comprise, for example, a photo receptor such as a photocell, a photo diode, or a charge coupled device (CCD) that is embedded in the bottom of the token 30.

The memory 54 includes various programs including an operating system 62 and a token control module 64 that, like the token control module 50 of the interactive display device 12, is configured to control use of the token 30. For example, the token control module 64 can, in some embodiments, receive the collected user identification information and determine whether to transmit information to the interactive display device 12 depending upon the user's identity and/or use privileges. In other embodiments, the token control module 64 can simply forward the received user identification information to the interactive display device 12. Operation of the token control module 50 is described in relation to FIGS. 5-7 below.

Various programs have been described herein. These programs comprise logic that can be stored on any computer-readable medium for use by or in connection with any computer-related system or method. In the context of this document, a computer-readable medium is an electronic, magnetic, optical, or other physical device or means that contains or stores a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Example systems and devices having been described above, operation of the systems and devices will now be discussed. In the discussions that follow, flow diagrams are provided. Process steps or blocks in these flow diagrams may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 5:
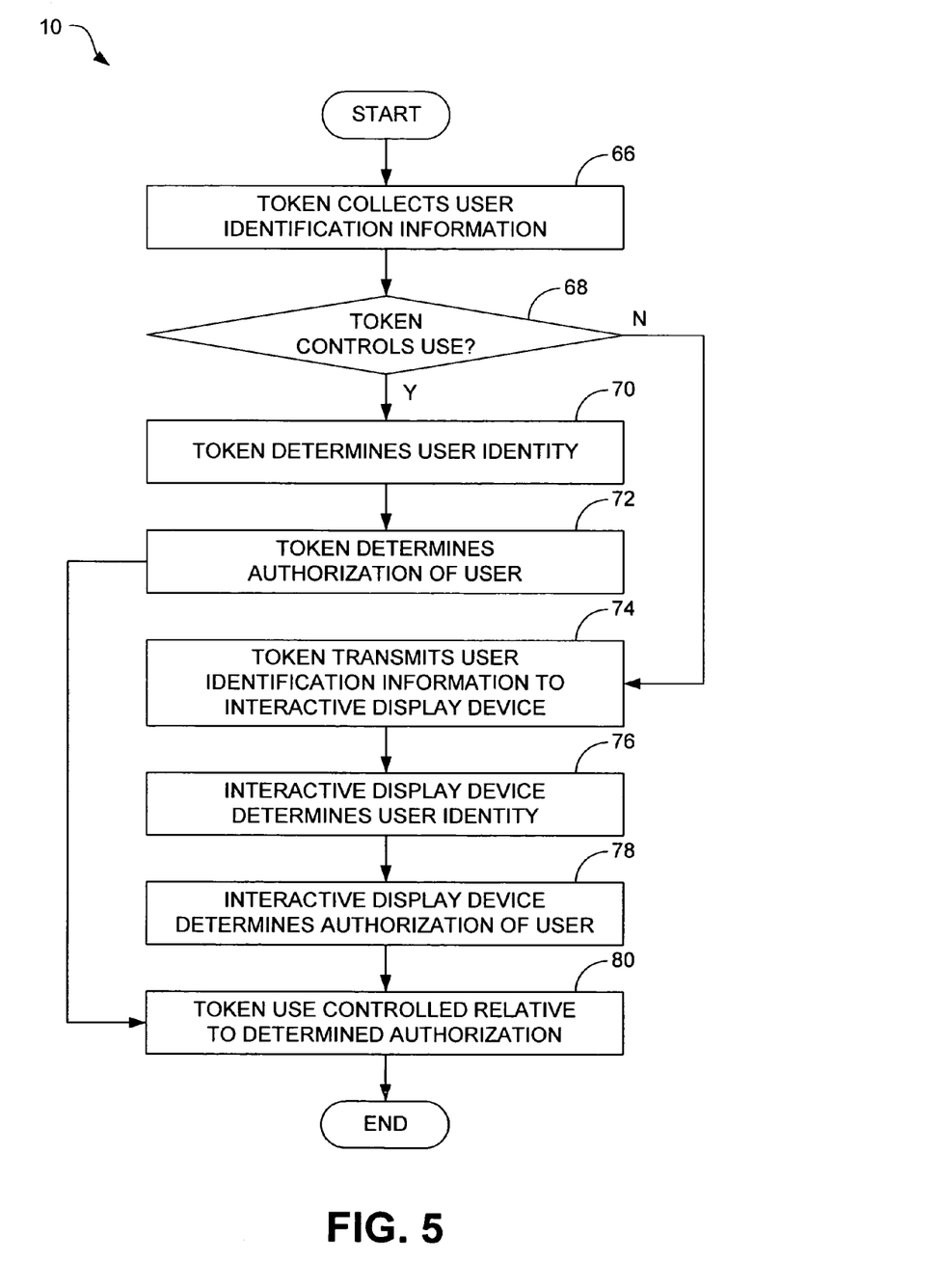
FIG. 5 is a flow diagram of an embodiment of a method for controlling use of a token.

FIG. 5 provides an example of a method for controlling a token that is used in conjunction with an interactive display device. Beginning with block 66 of FIG. 5, the token collects user identification information. As is identified above, such information can include any information that can be used to authenticate the user. For example, the identification information can comprise biometric information such as optical data obtained by scanning the user's finger or eye, or a pH detected from the user's skin. Alternatively, the identification information comprises a username and/or password that the user entered. As a further example, the identification information can be data stored on an ID card, such as a magnetic strip card or an RFID card or tag.

As is also mentioned above, the user identification information can be directly collected by the token, or indirectly collected from another device that directly collected the information. Whether the token directly or indirectly collects the user identification information may depend upon the configuration of the token. If the token comprises a relatively sophisticated device, such as a portable computing device, the token may comprise the hardware and software used to collect such information. For example, if the user identification information comprises image data that results from a scan of the user's eye, a PDA may comprise a camera with which such an image can be captured. If the token is a relatively simple device, however, such as a game piece, the user identification information may be collected by another device (e.g., PDA), which provides the information to the token using an appropriate transmission method (e.g., IR or RF transmission).

Irrespective of what user identification information is collected or the manner in which it is collected, flow from this point depends upon whether or not the token controls use of the token (decision block 68). In other words, flow depends upon whether it is the token or the interactive display device that will use the collected user identification information to determine if and how the user can manipulate the token relative to the interactive display device. If the token does not control use, flow continues to block 74 described below. If, on the other hand, the token does control use, flow continues on to block 70 at which the token determines the user identity and, from that identity, determines the authorization of that user, as indicated in block 72.

The authorization determination can be made relative to a look-up table or other data structure that correlates the user with a given set of privileges. The set of privileges may simply comprise the right to use (or not use) the token relative to the interactive display device in any possible manner. Alternatively, the set of privileges may include various different rights. For example, if the token is a shared device that is capable of downloading content from the interactive display device 12, certain users may not be permitted to download certain types of data (e.g., adult material). As another example, if the token is a shared device that is capable of facilitating online purchases, certain users may be prohibited from placing orders, may be limited to purchasing certain types of items (e.g., school supplies), or may be limited as to the amount that can be spent. Once the authorization determination is made, flow continues to block 80 described below.

With reference back to decision block 68, if the token does not control use, flow continues to block 74 at which the token transmits the directly or indirectly collected user identification information to the interactive display device. In such a case, it is the interactive display device that determines the identity of the user (block 76) and the user's authorization (block 78). By way of example, the authorization determination can be made in similar manner to that described above in relation to block 72.

Irrespective of whether the token or the interactive display device determines what actions the user is authorized to perform with the token, token use is controlled relative to that determined authorization, as indicated in block 80. Therefore, the manner in which the token is used with the interactive display device is controlled relative to who the user is.

Figure 6A:
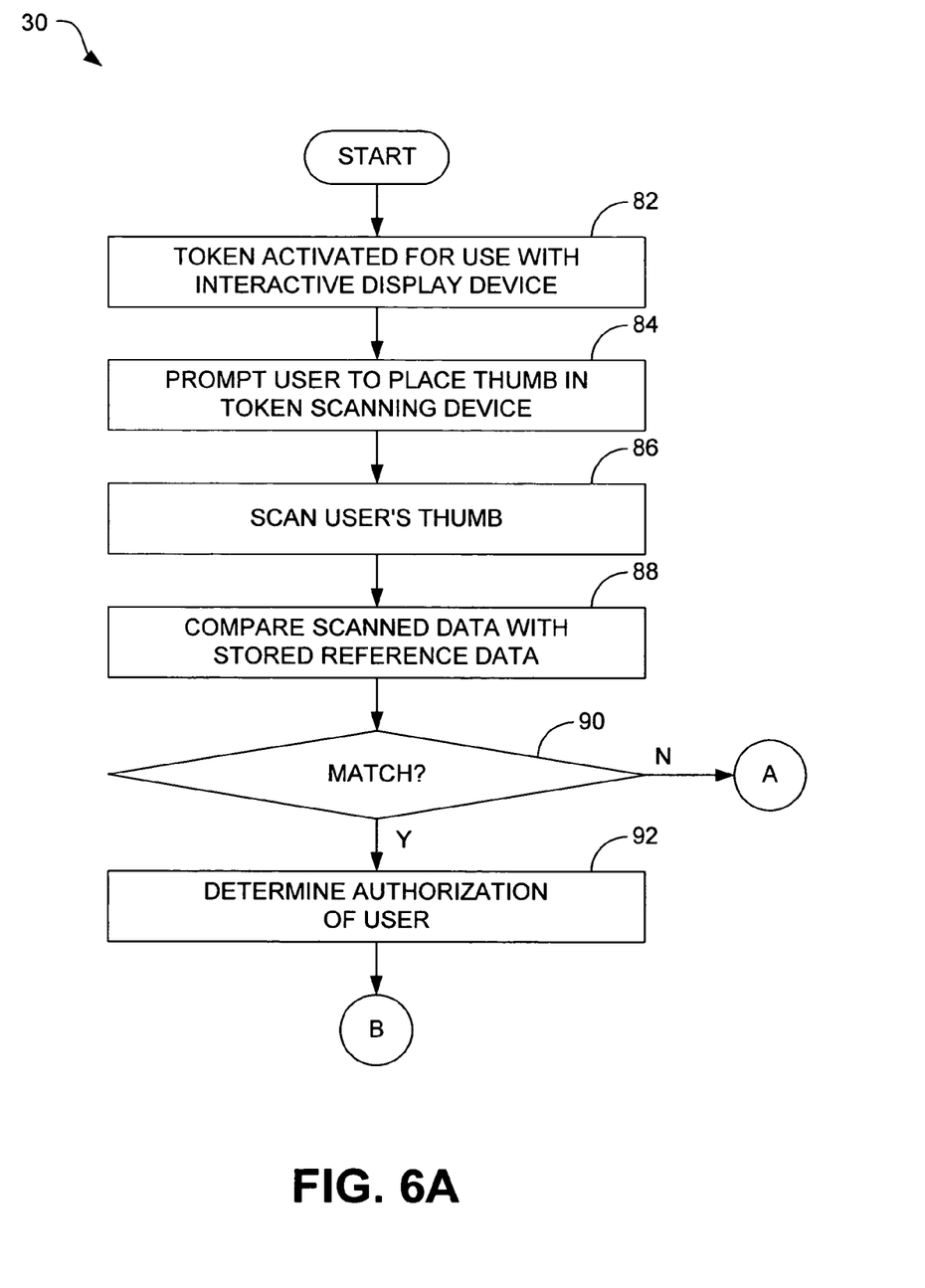
FIGS. 6A and 6B provide a flow diagram of an embodiment of operation of the token of FIG. 4.
Figure 6B:
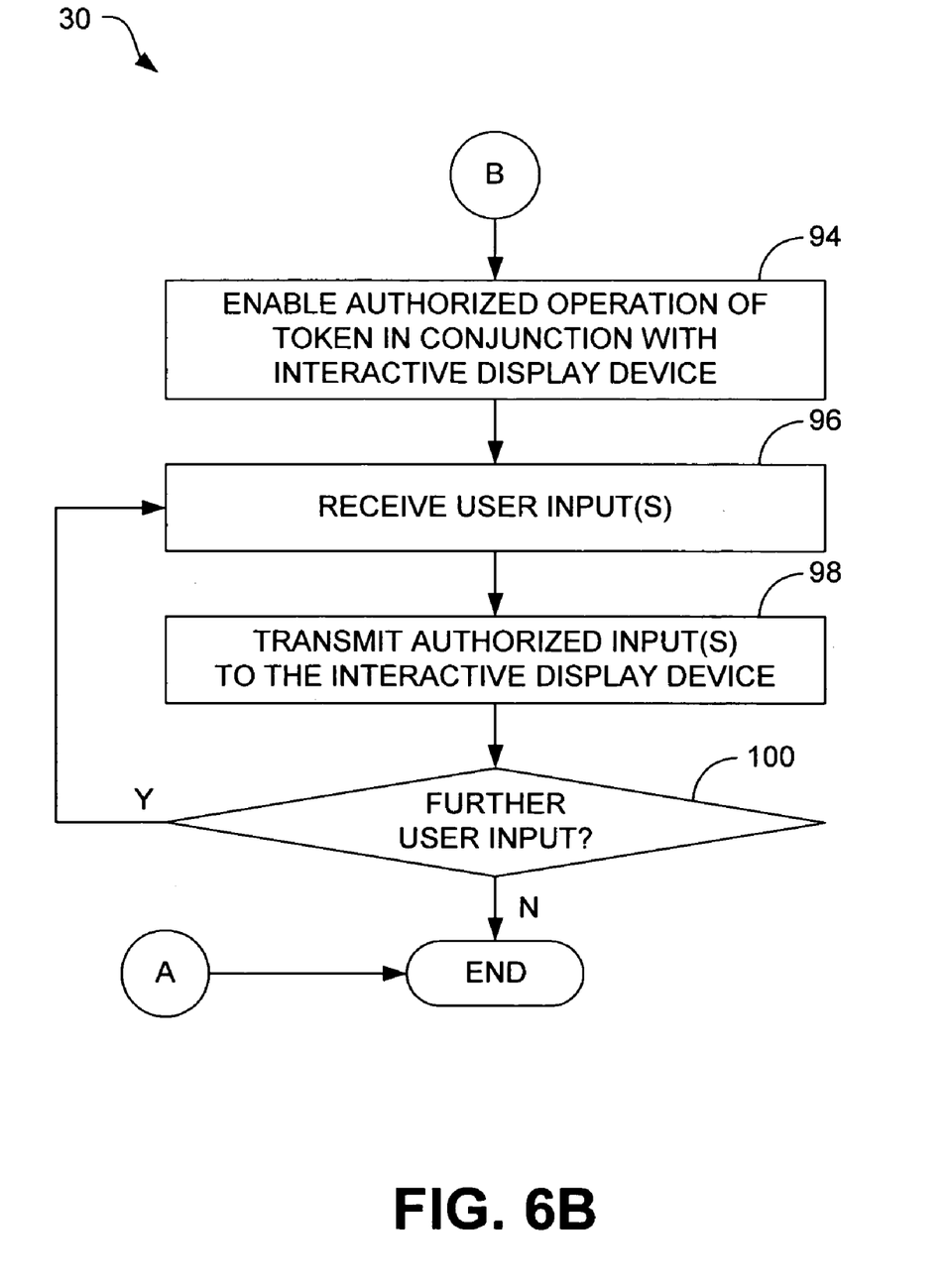

FIGS. 6A and 6B provide a specific example of authentication and authorization of a user that can, in some embodiments, be performed by a token 30. In this example, the token 30 is assumed to be a relatively sophisticated device, such as a portable computing device. Beginning with block 82 of FIG. 6A, the token 30 is activated for use with an interactive display device. Such activation can occur, for example, in response to the token 30 being placed upon the display surface (e.g., surface 20, FIG. 2) of the interactive display device and bi-directional communications between the token and the display device that result from such placement. Alternatively, such activation can occur relative to an affirmative command or selection entered into the token 30 by the user.

Once activated, the token 30 can prompt the user to place the user's thumb (or other finger) in a scanning device of the token, as indicated in block 84. Such a scanning device can, for example, comprise a line scanner provided on the token 30 or a camera that is capable of capturing an image of the swirls of the user's thumbprint. Next, for example in response to sensing such placement of the thumb or receiving a "ready" indication from the user, the token 30 scans the user's thumb, as indicated in block 86.

Through such scanning, the token 30 collects biometric data that can be used to make an accurate determination of who the user is. By way of example, that determination comprises comparing the scanned data with stored reference data, as indicated in block 88. Such data can be, for example, stored in association with the token control module 64 within token memory 54. Notably, the data can comprise data for multiple users of the token 30, each potentially having different usage rights. From the comparison, the token 30, and the token control module 64 in particular, can determine whether the scanned data matches stored reference data, as indicated in decision block 90. If there is no match, the user is not currently entitled to use the token 30 relative to the interactive display device, and no such use is enabled. In such a case, flow for the use session is terminated. Optionally, multiple tries may be permitted before the token denies use.

If there is a match, however, flow continues to block 92 at which the token 30 determines the authorization of the user. That determination can be made in similar manner to that described above. Specifically, the recognized user identity can be used as a key in a lookup table or other data structure to determine that user's rights relative to using the token 30 in conjunction with the interactive display device.

Referring next to block 94 of FIG. 6B, the token 30 (e.g., token control module 64) enables all authorized operations of the token in conjunction with the interactive display device. Such use may include using applications of the interactive display device, downloading data from the interactive display device, purchasing items via the interactive display device, and so forth. During such use, various user inputs can be received, as indicated in block 96. Such inputs may comprise selections or other commands input directly into the token 30. If such inputs are received, those that are authorized for the authenticated user can be transmitted to the interactive display device, as indicated in block 98. By filtering which inputs are communicated to the interactive display device, the token 30 (e.g., token control module 64) controls use of the token with the interactive display device relative to the identity of the user.

Referring next to decision block 100, if there is further input by the user, flow returns to block 96 at which those inputs are received. If there are no further inputs, however, flow for the session is terminated.

As is mentioned above, the token 30 can, in some embodiments, provide the collected user identification information to the interactive display device to enable that device to make the authorization determination. Such an implementation may be desirable in situations in which the token is relatively simple and does not possess the hardware and/or software resources to make the authorization determination. An example of such a scenario is described below in relation to FIGS. 7 and 8.

Figure 7:
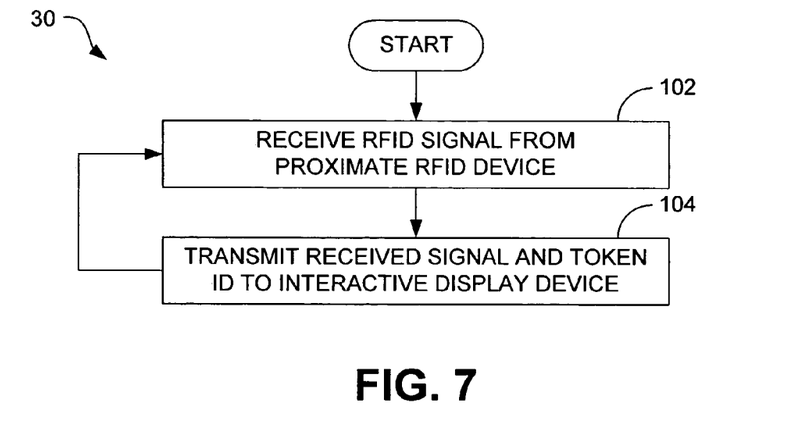
FIG. 7 is a flow diagram of a further embodiment of operation of the token of FIG. 4.

With reference to FIG. 7, a token 30, for example a simple game piece, receives an RFID signal from a proximate RFID device, as indicated in block 102. Such a signal can, for example, be generated by an RFID tag that the user wears around his or her wrist (e.g., on a bracelet) at least when the user wishes to interact with the game piece. When such an RFID signal is received, the game piece can transmit the received signal along with a token ID that identifies the game piece, or a given "side" to which the game piece belongs, to the interactive display device, as indicated in block 104. Such flow can loop continually such that all RFID signals received by the game piece are transmitted to the interactive display device.

Figure 8:
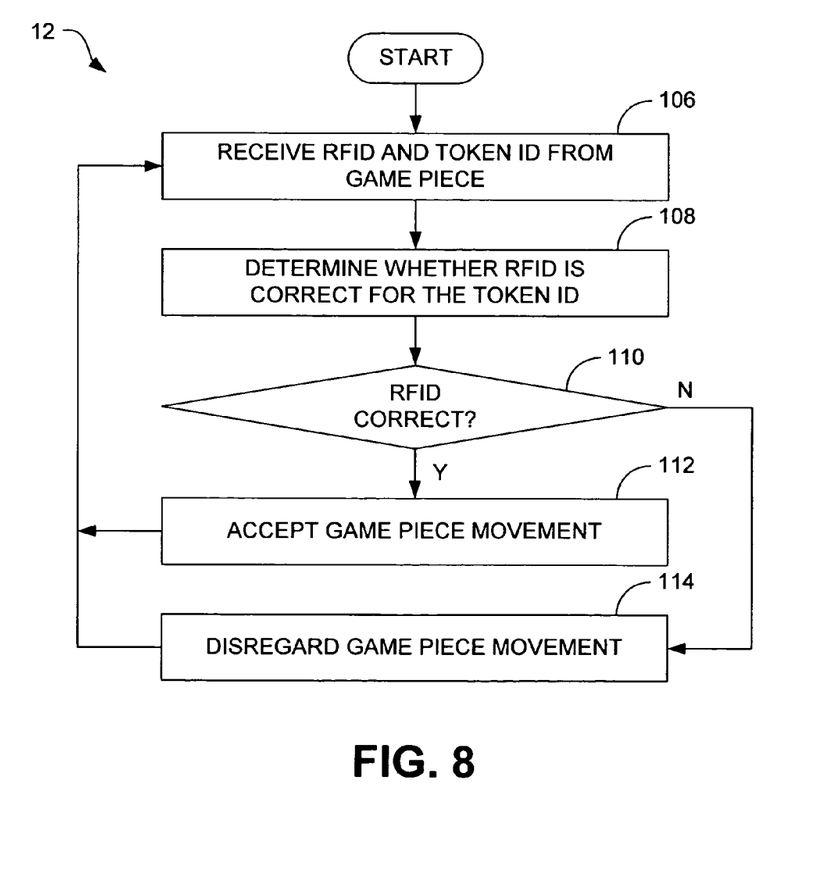
FIG. 8 is a flow diagram of an embodiment of operation of the interactive display device of the FIG. 3.

Referring now to FIG. 8, the RFID and token ID transmitted by the game piece 30 are received by the interactive display device 12, as indicated in block 106. From those two pieces of information, the interactive display device 12, and the token control module 50 in particular, determines whether the RFID is correct for the token ID (block 108) and, therefore, whether the person who is manipulating the game piece is entitled to do so. That determination can be made relative to information collected during an initialization that is performed prior to a game being played. Assume, for instance, that the game to be played is checkers. During the initialization, a first player can indicate which side, red or black, the player will be playing by selecting (e.g., touching or moving) a black game piece or a red game piece. A second player can then do the same (presumably selecting the other color). When such selections are made by the players with their RFID tags position in proximity to the game pieces, the interactive display device 12 can record which side each player is playing and therefore allow each player to manipulate their own game pieces and not those of other players.

Referring next to decision block 110, if the RFID is correct relative to the token ID, for example the token ID indicates that the game piece is a red game piece and the user (as identified by his or her RFID) is playing the red side in the game, a movement of the game piece is accepted, as indicated in block 112. In such a case, the movement is registered as valid. If, on the other hand, it is determined that the RFID is not correct for the token, for example the wrong player is moving the game piece, movement of the game piece is disregarded, as indicated in block 114, as an invalid move. When such an invalid move is detected, the interactive display device 12 can further inform the players of the violation. By way of example, a warning message can be displayed and/or an alarm can be sounded.

Flow loops in FIG. 8 in similar manner to that described above in relation to FIG. 7. Accordingly, the interactive display device 12, with the aid of the game pieces (i.e., tokens), enforces proper play of the game for its duration.

We claim:

1. A method, comprising:
   a token collecting identification information from a user;
   the token comparing the collected identification information with stored reference information;
   the token determining whether the user is entitled to use the token;
   the token determining from the stored reference information the authorization of the user to manipulate the token relative to an interactive display device;
   the token receiving user inputs requesting interaction between the token and the interactive display device; and
   the token filtering the user inputs so that only inputs for which the user is authorized can be transmitted to the interactive display device; and
   the token transmitting only the authorized inputs to the interactive display device.

2. The method of claim 1, wherein collecting the identification information comprises collecting user biometric information.

3. The method of claim 1, wherein collecting the identification information comprises receiving at least one of a username and a password.

4. The method of claim 1, wherein collecting the identification information comprises receiving data stored on and transmitted by a separate identification device.

5. The method of claim 1, wherein the token comprises a portable computing device.

6. An interactive display device, comprising:
a display surface;
a display medium to display image data on the display surface;
a token input/output device configured to communicate with a token placed on the display surface; and
a controller configured to generate the image data and comprising a token control module configured to receive identification information collected by and transmitted from the token and to determine privileges of a user to manipulate the token relative to the interactive display device using the identification information.

7. The interactive display device of claim 6, wherein the token input/output device comprises a receiver that receives optical signals affirmatively transmitted by the token.

8. The interactive display device of claim 6, wherein the token input/output device comprises a transmitter that transmits optical signals to the token.

9. The interactive display device of claim 6, wherein display device is formed as a table having the display surface as a tabletop.

10. A display system, comprising:
a tabletop display device including a controller to generate image data, a horizontal display surface and a display medium to display the image data, and a communication device configured to communicate with tokens placed on the display surface; and
a token configured for use with the display device, the token including a processing device, memory, and a communication device configured to communicate with the display device when the token is placed on the display surface, the memory including a token control module configured to collect identification information from a user, to determine from the identification information authorization of the user to manipulate the token relative to the display device, to receive user inputs, and to filter the user inputs so that only inputs for which the user is authorized can be transmitted to the interactive display device.

11. The system of claim 10, wherein the token comprises a portable computing device.

12. The system of claim 10, wherein the token comprises a user identification device that directly collects user biometric information or a username or password of the user.

* * * * *

UNITED STATES PATENT AND TRADEMARK OFFICE
CERTIFICATE OF CORRECTION

PATENT NO.         : 8,333,658 B2
APPLICATION NO.    : 11/037845
DATED              : December 18, 2012
INVENTOR(S)        : Michael Blythe et al.

It is certified that error appears in the above-identified patent and that said Letters Patent is hereby corrected as shown below:

In the Specifications:

In column 1, line 8, delete "device" and insert -- device. --, therefor.

In column 1, line 57, after "'such as" insert -- an --.

In column 1, line 61, delete "the" and insert -- a --, therefor.

In column 4, line 8, delete "identify" and insert -- identity --, therefor.

In column 8, line 21, delete "position" and insert -- positioned --, therefor.

Signed and Sealed this
Second Day of July, 2013

Teresa Stanek Rea
*Acting Director of the United States Patent and Trademark Office*